United States Patent
Rao et al.

(10) Patent No.: US 8,284,042 B2
(45) Date of Patent: Oct. 9, 2012

(54) SYSTEM AND METHOD OF VEHICLE PASSENGER DETECTION FOR REAR SEATING ROWS

(75) Inventors: Manoharprasad K. Rao, Novi, MI (US); Kwaku O. Prakah-Asante, Commerce Township, MI (US); Tai Luu, Westland, MI (US); Mark A. Cuddihy, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 12/568,305

(22) Filed: Sep. 28, 2009

(65) Prior Publication Data

US 2011/0074566 A1    Mar. 31, 2011

(51) Int. Cl.
    *B60Q 1/00*    (2006.01)
(52) U.S. Cl. .................................... 340/457.1
(58) Field of Classification Search ............... 340/457.1, 340/425.5, 667, 522; 180/268, 286; 701/45
    See application file for complete search history.

(56) References Cited

U.S. PATENT DOCUMENTS

| | | | |
|---|---|---|---|
| 3,814,877 A | 6/1974 | Alvarez | |
| 5,483,221 A * | 1/1996 | Mutter et al. | 340/457.1 |
| 6,078,854 A | 6/2000 | Breed et al. | |
| 6,362,734 B1 | 3/2002 | McQuade et al. | |
| 6,474,683 B1 | 11/2002 | Breed et al. | |
| 6,489,889 B1 | 12/2002 | Smith | |
| 6,501,374 B1 | 12/2002 | King et al. | |
| 7,012,533 B2 | 3/2006 | Younse | |
| 7,085,635 B2 * | 8/2006 | Boman et al. | 701/36 |
| 7,170,401 B1 | 1/2007 | Cole | |
| 7,271,712 B2 * | 9/2007 | Rubel | 340/457.1 |
| 7,348,880 B2 | 3/2008 | Hules et al. | |
| 7,353,088 B2 | 4/2008 | Eagen et al. | |
| 2001/0042977 A1 | 11/2001 | Breed et al. | |
| 2002/0145516 A1 | 10/2002 | Moskowitz et al. | |
| 2002/0163426 A1 | 11/2002 | Moskowitz | |
| 2002/0188392 A1 | 12/2002 | Breed et al. | |
| 2003/0002690 A1 | 1/2003 | Breed et al. | |
| 2003/0136600 A1 | 7/2003 | Breed et al. | |
| 2003/0154009 A1 | 8/2003 | Basir et al. | |
| 2003/0160689 A1 * | 8/2003 | Yazdgerdi | 340/457.1 |
| 2003/0201894 A1 | 10/2003 | Li | |
| 2004/0039509 A1 | 2/2004 | Breed | |

(Continued)

FOREIGN PATENT DOCUMENTS

JP        06-51785 A    2/1994

*Primary Examiner* — Phung Nguyen
(74) *Attorney, Agent, or Firm* — Frank A. MacKenzie; Brook Kushman P.C.

(57) ABSTRACT

A system for detecting a passenger in a rear seating row of a vehicle and alerting an occupant of a vehicle when a passenger safety device in a rear row is not properly used. Occupancy is determined by sensing any actuation of a switch or control in the rear row along with detecting sounds made by the rear row passenger. A processor receives control activity signals indicating that a control has been actuated, receives audio signals generated by a microphone, and uses the control activity signals and the audio signals in combination to determine that the passenger is present. The processor also receives a status signal from the passenger safety device indicating that it is not in proper use. An occupant alerting device provides an alert to the occupant if the processor determines that the passenger is present and the passenger safety device is not in proper use.

20 Claims, 6 Drawing Sheets

U.S. PATENT DOCUMENTS

| | | |
|---|---|---|
| 2004/0155783 A1 | 8/2004 | Al-Sheikh |
| 2006/0219459 A1 | 10/2006 | Suzuki |
| 2009/0027188 A1 | 1/2009 | Saban |
| 2009/0292528 A1* | 11/2009 | Kameyama ...................... 704/9 |

* cited by examiner

SYSTEM AND METHOD OF VEHICLE PASSENGER DETECTION FOR REAR SEATING ROWS

BACKGROUND

1. Technical Field

This invention relates to seat belt usage indicating systems, and more particularly to such a system that monitors rear seating rows of a vehicle for the presence of passengers and generates an alert if a passenger restraint system in the rear seating rows is not properly used.

2. Background Art

Modern automotive vehicles generally include seat belt usage indicating systems for occupants of the front row seating positions of the vehicle. These systems are intended to provide a reminder to the front seat occupants if they fail to properly fasten their seat belts when the vehicle is in operation.

As the safety advantage of restraint belt use by all vehicle occupants has been recognized, it has been proposed to extend seat belt usage monitoring to the rear seating rows so that vehicle occupants (the driver of the vehicle and/or vehicle passengers) may be alerted if a passenger in a rear seating row is not using his or her restraint belt.

Since such an alert is only appropriate and useful when a seat in the rear row is actually occupied, some way must be provided to detect the presence of a passenger in a particular seat. Many different types of seat occupancy sensors have been proposed. These include pressure-sensing bladders or load-responsive electrical switches installed in the seat, optical devices using scene recognition algorithms, and capacitive sensors. All of these proposed devices add considerable complexity and expense to the vehicle.

In view of the above, it would be advantageous to provide a restraint belt monitoring system for the rear rows that is able to accurately determine occupancy with little or no added cost and complexity.

SUMMARY

According to a first aspect of the present invention, a system for alerting a driver or other occupant of a vehicle when a passenger safety device in a rear row is not properly used comprises at least one control actuatable by a passenger in the rear row, at least one microphone detecting sound made by the rear row passenger, and a processor receiving control activity signals indicating that the at least one control has been actuated and audio signals generated by the microphone. The processor uses the control activity signals and the audio signals to determine whether a passenger is present in the rear row, and further receives a status signal from the passenger safety device indicating that it is not in proper use. An alerting device provides an alert to the occupant if the processor determines that the passenger is present and the passenger safety device is not in proper use.

According to another aspect of the present invention, a method for alerting an occupant of a vehicle when a passenger safety device in a rear row is not properly used comprises monitoring at least one control located in the rear row; calculating a control activity value based at least in part upon a number of actuations of the at least one control; sensing sound in the rear row; calculating a voice output value indicating whether or not the sensed sounds include human speech; considering the control activity value and the voice output value in combination to determine whether a passenger is present in the rear row; monitoring a status of the passenger safety device to determine if it is properly used; and alerting the occupant if the passenger is present and the passenger safety device is not properly used.

Other features and advantages of the present invention will be readily appreciated, as the same becomes better understood after reading the subsequent description taken in conjunction with the accompanying drawings.

DETAILED DESCRIPTION

Figure 1:
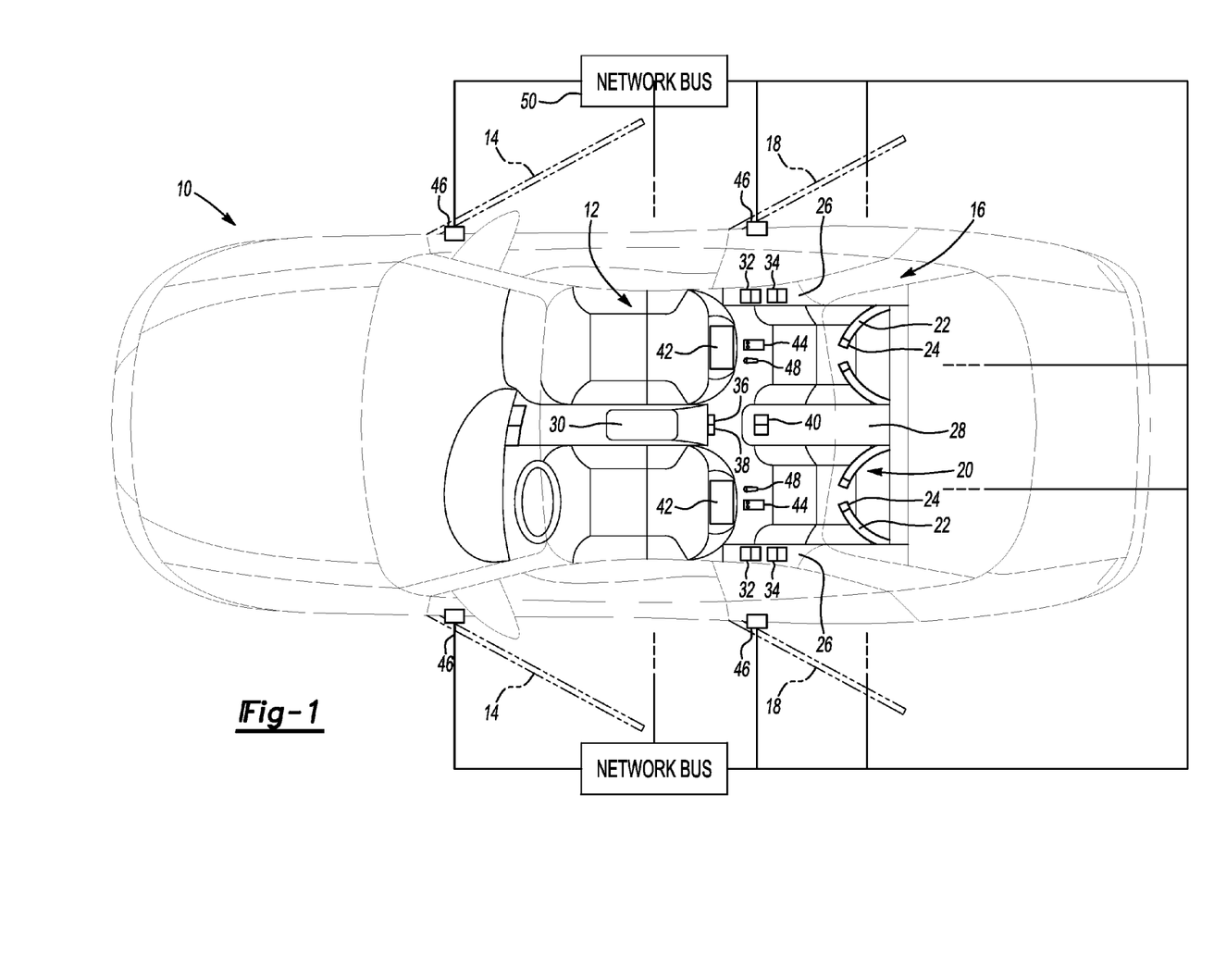
FIG. 1 is a schematic depiction of a system according to an embodiment of the invention.

Referring to the drawings and in particular to FIG. 1, a vehicle 10 includes a passenger compartment that may be generally divided into a front seating row 12 accessible using front doors 14 and a rear seating row 16 accessible using rear doors 18. For simplicity of description, the vehicle is depicted as being a four-door vehicle having only one rear row, but the present invention is equally applicable to a vehicle having any number of doors, rows, and seating positions.

Rear row 16 is shown to include a bench seat 20 extending across the width of the vehicle and having left and right seating positions defined by passenger restraint belts 22. For simplicity of the diagram, only a lap-belt is depicted at each seating position, but shoulder belts may also be provided. Each restraint belt 22 includes a latch for fastening the belt in its operative position around the passenger. Each restraint belt/latch combination includes a latch status sensor 24 that generates a signal indicating whether the latch is in a fastened or an unfastened condition. Additional information regarding latch status switches may be found in U.S. Pat. No. 6,501,374, the disclosure of which is incorporated herein by reference.

Rear row 16 is equipped with left and right side armrests 26, a center armrest 28, and a forward center console 30. Numerous electro-mechanical controls and switches are located in rear row for actuation by passengers occupying the rear row. Examples of such controls/switches may include, for example, door lock actuators 32 and power window switches 34 located on the side armrests 26, audio entertainment system controls 36 and heating/ventilation/air conditioning (HVAC) controls 38 located on the forward center console 30, and seat heater controls 40 located on the center armrest 28. Audiovisual entertainment consoles 42 are located in the back of front seats headrests for viewing by passengers in the rear row seating positions and include related controls and switches. Wireless remote controllers 44 may also be provided for one or both of the entertainment consoles 42.

A door status switch 46 is associated with each of the vehicle doors 14, 18. Door status switches 46 generate signals indicating whether the respective doors 14, 18 are in a closed or open condition.

Microphones 48 are located in the passenger compartment to detect speech and/or other sounds made by rear row passengers. Two microphones 48 are depicted, one on the left side of the passenger compartment and one on the right side of the passenger compartment. Microphones 48 may be positioned to also detect speech and/or other sounds made by occupants of the front row. One or more of the microphones 48 may also be used in a voice command system that utilizes speech-recognition and/or in a hands-free communication system.

Electrical signals from each of the sensors, switches, controls, and/or the systems operated by the switches/controls are communicated to a network communication bus 50 (such as, for example, a CAN bus), as is well known in the automotive electronics art. For clarity, FIG. 1 shows only a few of the components connected with network bus 50, but it is to be understood that all of the pertinent components are in data communication with the bus.

Figure 2:
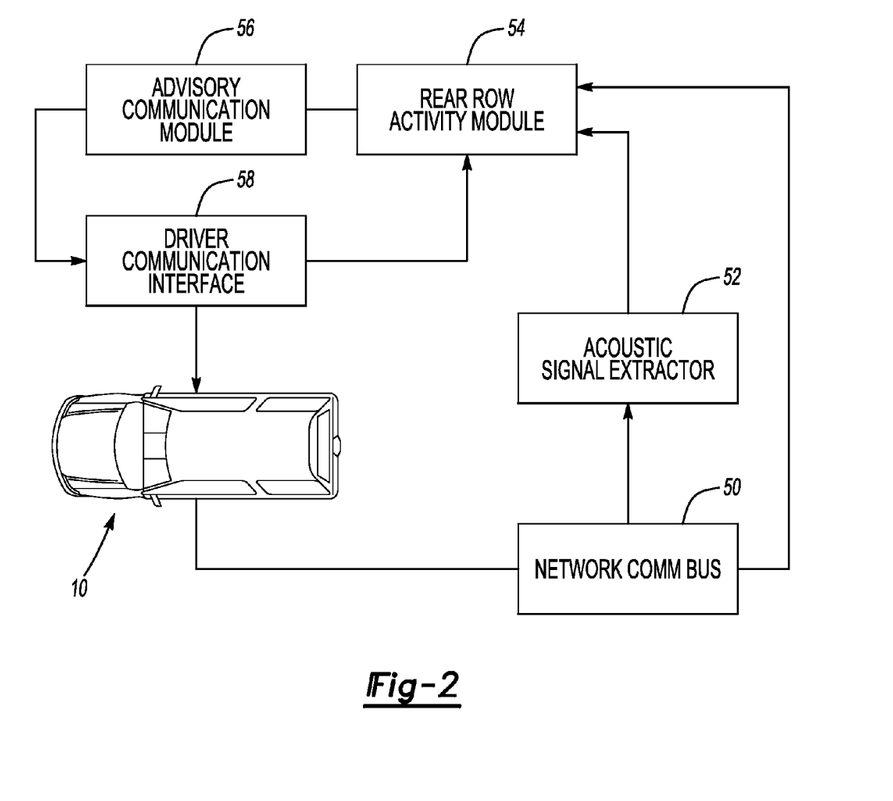
FIG. 2 is a high-level flow diagram illustrating operation of a system according to an embodiment of the invention.

Referring now to FIG. 2, an Acoustic Signal Extractor (ASE) 52 acquires the acoustic signals generated by the microphones 48 from network bus 50 and passes the signals to a Rear Row Activity Module (RRAM) 54. RRAM 54 applies specialized filtering and acoustic signature analysis routines to the microphone signals to identify when they are indicative of voices of rear row passengers. This may be accomplished by determining an acoustic energy level at the fundamental frequencies that are characteristic of human speech.

RRAM 54 first applies a sliding band pass window to monitor the characteristic frequency bands of human speech. A discrete forth-order band-pass of the form:

$$H(z) = \frac{b(z)}{a(z)} = \frac{b_1 + b_2 z^{-1} + b_3 z^{-2} + b_4 z^{-3} + b_5 z^{-4}}{1 + a_2 z^{-1} + a_3 z^{-2} + a_4 z^{-3} + a_5 z^{-4}} \quad (1)$$

is applied to attenuate low frequency noise and higher frequency components, where z is the z-transform for discrete-time operations.

For real-time computation, the filter is implemented in the form:

$$y(n) = b(1)x(n) + b(2)x(n-1) + b(3)x(n-2) + b(4)x(n-3) + b(5)x(n-4) - a(2)y(n-1) \ldots - a(3)y(n-2) - a(4)y(n-3) - a(5)y(n-4) \quad (2)$$

where b and a are the coefficients of the filter, x is the input microphone signal, and y the output filtered signal. The band pass filtered rear microphone signals are then transformed into the frequency domain:

$$X(i+1) = \sum_{k=0}^{N-1} x_{k+1} e^{-2\pi j \frac{ik}{N}} \text{ for } i = 0 \ldots, N-1 \quad (3)$$

where X is the filtered time domain signal obtained from the rear microphones 48 within the frequency band, and N is the number of sample points.

A measure of the acoustic energy received from the rear microphones 48 within the frequency band (commonly expressed as power spectral density, PSD), Received Sound Energy, RSE, is obtained from:

$$RSE_{(freq\_band)} = \frac{1}{n}|X|^2 \quad (4)$$

Figure 3:
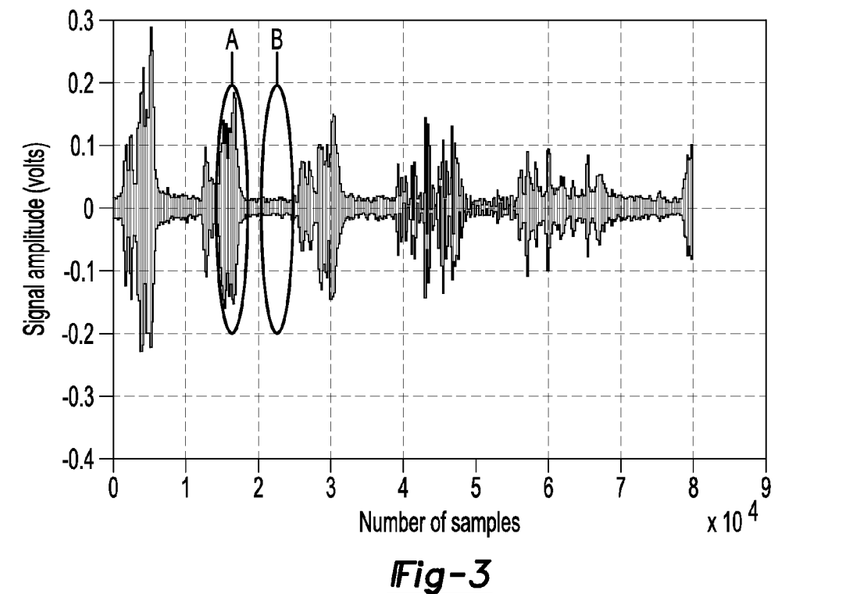
FIG. 3 is a graphic depiction of an example of the audio signal output by a microphone.

FIG. 3 is a graph showing a time domain response of the signal from a microphone detecting sound in the rear row. In the segment of the graph indicated as A, the microphone is detecting occupant speech along with music from a vehicle entertainment system. In segment B, there is no occupant speech and the microphone is detecting only the background music.

Figure 4:
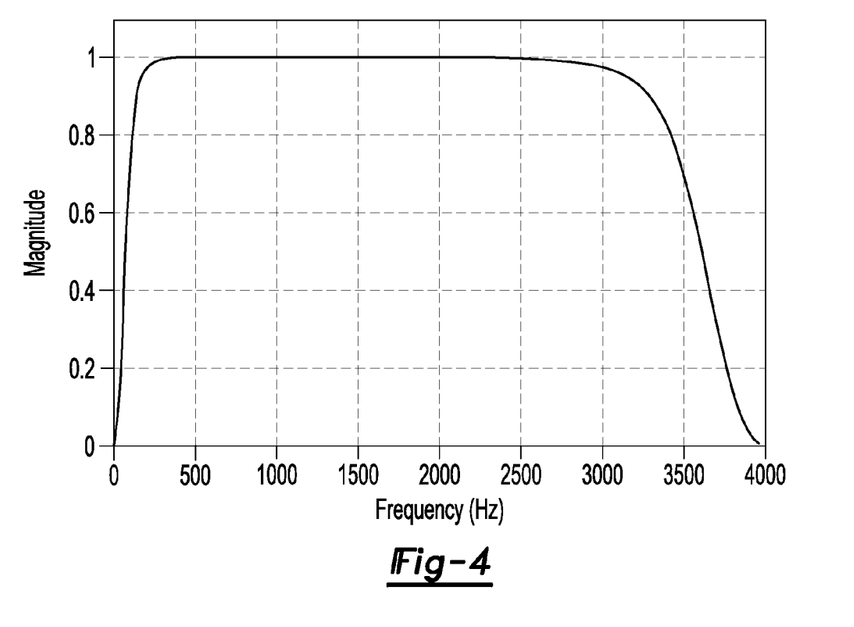
FIG. 4 is a graph showing the frequency response of a digital filter employed in an embodiment of the invention.

FIG. 4 shows the impulse response of a tailored band-pass filter of the type described in equations 1 and 2. The frequency range is primarily between 100 to 3500 Hz. A sliding window band-pass response filter is applied in order to extract the acoustic signature.

Figure 5:
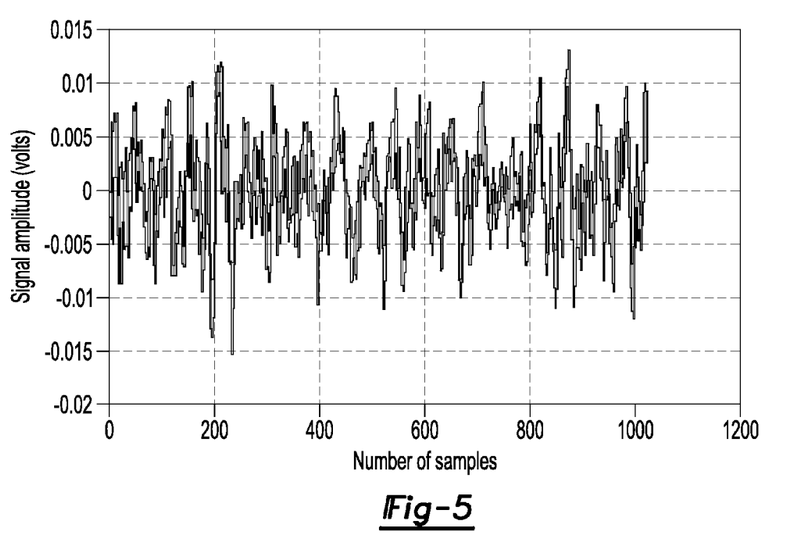
FIG. 5 is a graph of a background music segment of the output shown in FIG. 3 after processing by a discrete time band-pass filter according to an embodiment of the invention.
Figure 6:
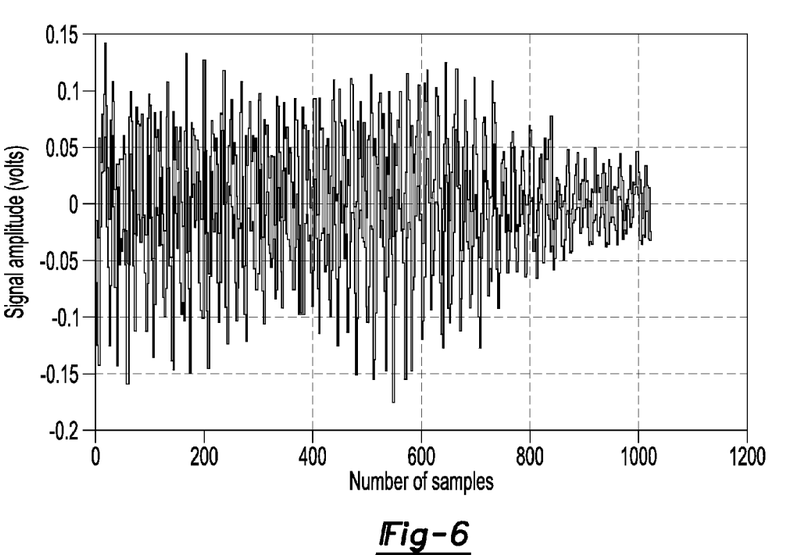
FIG. 6 is a graph of an occupant speech segment of the output shown in FIG. 3 after processing by the discrete time band-pass filter according to an embodiment of the invention.
Figure 7:
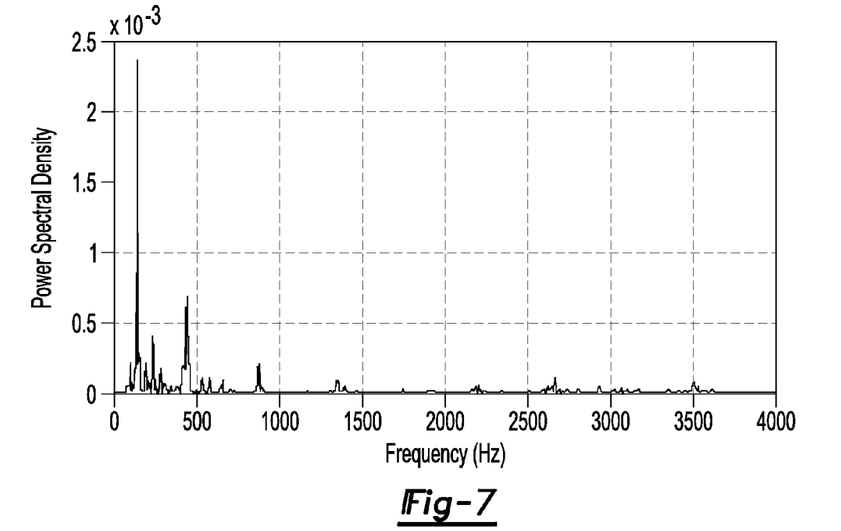
FIG. 7 is a graph showing the power spectral density of the background music signal of FIG. 5.
Figure 8:
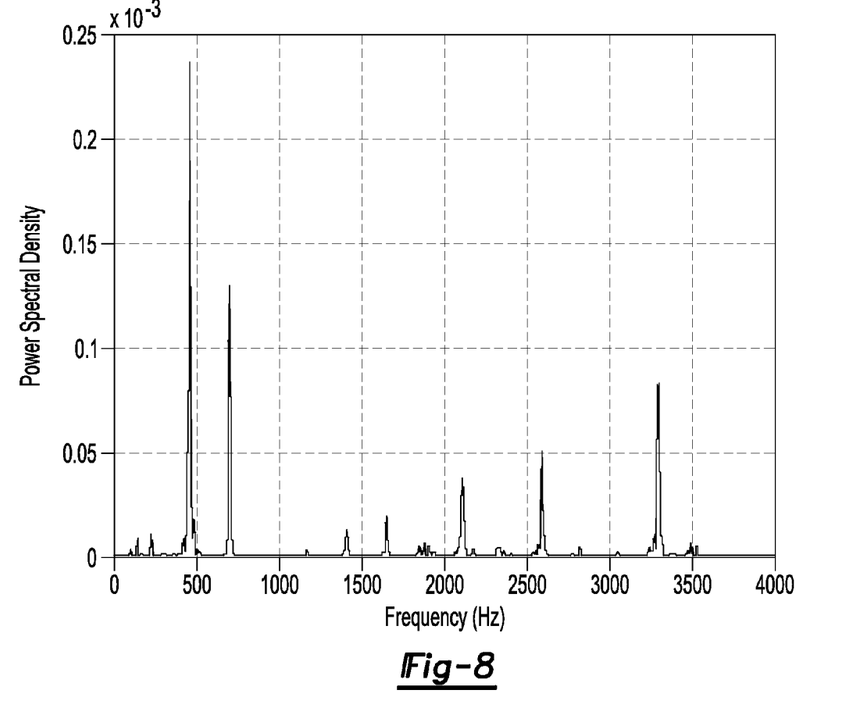
FIG. 8 is a graph showing the power spectral density of the occupant speech signal of FIG. 6.

FIGS. 5 and 6 show the discrete time filtered time domain signals for sections B (background music, no speech) and A (speech and background music), respectively. FIGS. 7 and 8 show the corresponding frequency response (power spectral density) for those two conditions.

A voice output value V is given by:

$$V(k) = \begin{cases} 1 & \text{if } RSE(k) > RSE_T \\ 0 & \text{otherwise} \end{cases} \quad (5)$$

where $RSE_T$ is a threshold value selected for rear row voice detection.

The relatively high total energy level that occurs when a passenger is speaking, as seen in FIG. 8, results in a computed V value equal to 1 (see Equation 5). In contrast, a V value of 0 is obtained for the no-speech scenario depicted in FIG. 7.

Figure 9:
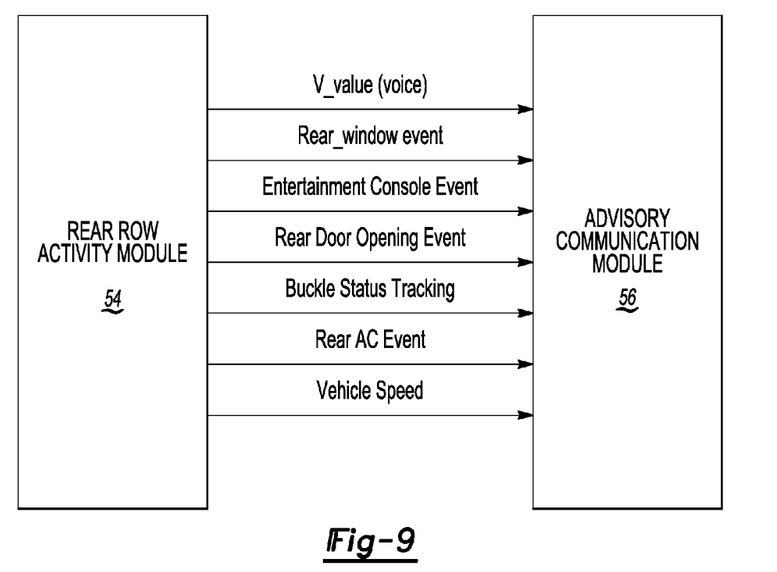
FIG. 9 is a schematic depiction of signals passing from a Rear Row Activity Module to an Advisory Communication Module according to an embodiment of the invention.

The resulting voice output value V is sent to an Advisory Communication Module (ACM) 56. As best seen in FIG. 9, ACM 56 also receives control activity signals indicating a manipulation of any of the switches, controls, and/or systems that are available to a passenger in the rear row. Examples of such switches, controls, and/or systems are given above in relation to FIG. 1. The control activity signals need only indicate that some actuation or manipulation of the related switch, control, or system has taken place, and may or may not also indicate the actual status (ON/OFF, LOW/MED/HI, OPEN/CLOSED, etc.) of the system being controlled. Actuation of any one of the rear row switches/controls/systems is termed an "event", and each event is an indication of the presence of one or more passengers in the rear row. RRAM 54 tracks the control activity signals and their durations, and performs signal integrity checks before relaying the signals to ACM 56.

ACM 56 calculates an aggregated rear-seat activity value, ARA_value, given as:

$$ARA\_value = Vw_v + \sum_{n=1}^{N} P_n w_n \quad (6)$$

$$\max(ARA\_value) = 1.0 \quad (7)$$

where V is the voice output value, and P is the control activity value. The weights $w_v$ and $w_n$ are rule-based adaptive gains and may be based on the level and/or the nature of rear-seat activity. N is the number of rear row control activations/manipulations (events) detected.

If the aggregated rear row activity value calculated in equation 6 is greater than a defined threshold value and the rear-seat restraint belt 22 is not properly fastened a recommendation is sent to the Driver Communication Interface (DCI) 58 to alert the driver. If the voice output value is low or unavailable, a higher contribution of the rear-seat activity event is required to meet the threshold required to alert the driver.

The alert generated by DCI 58 may comprise any type (or combination of types) of audio, voice, visual, or haptic stimulus that effectively communicates to the driver or other occupant of the vehicle the likelihood that one or more rear row passengers does not have her/his restraint belt fastened. Vehicle performance inputs, such as current vehicle speed, may also be used to determine when/if an occupant alert is generated. For example, an occupant alert may be suppressed if the vehicle is stationary or travelling at less than a relatively low threshold speed.

Figure 10:
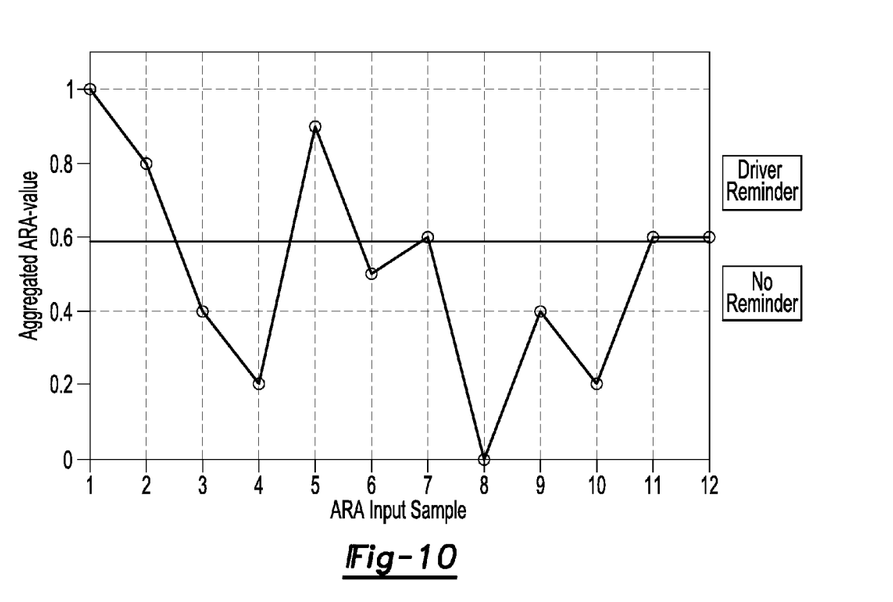
FIG. 10 is a graph showing an example of the aggregate ARA value for different conditions.

FIG. 10 is a graphic example of the aggregated rear-seat activity value computation for voice output value V, and with three rear row control activity events (N=3). A threshold value of 0.6 has been selected, so the occupant is alerted when the aggregated value is equal or greater than that value. The threshold value may be fixed or may be adjustable in accordance with the needs/desires of an individual vehicle owner/operator.

If a rear row passenger unfastens the restraint belt while the vehicle is in motion for a set period of time, an alert may be provided to the occupant. The passenger's response to the alert is tracked and if the restraint belt is not re-fastening after a set period of time after the alert, the alert is terminated.

If at any time the latch status sensors 24 indicate that the restraint belts have been fastened, the occupant alert is terminated. The vehicle occupant may be able to terminate the occupant alert, for example by manipulating a switch or by delivering a voice command if the vehicle is equipped with a voice-recognition system. The occupant alert may escalate in urgency (frequency, volume, etc.) if the rear row belts remain unfastened. The occupant alert may be terminated if the seat belt latches remain unfastened after a certain length of time.

The present invention has been described in an illustrative manner. It is to be understood that the terminology used is intended to be in the nature of words of description rather than of limitation.

Many modifications and variations of the present invention are possible in light of the above teachings. Therefore, within the scope of the appended claims, the present invention may be practiced other than as specifically described.

What is claimed:

1. A system for alerting an occupant of a vehicle when a passenger safety device in a rear row is not properly used comprising:
   at least one control actuatable by a passenger in the rear row;
   at least one microphone disposed within the vehicle and detecting sound made by the passenger;
   a processor receiving control activity signals indicating that the at least one control has been actuated, calculating a control activity value based at least in part on a number of actuations of the at least one control, receiving audio signals generated by the microphone, using the control activity value and the audio signals to determine that the passenger is present, and receiving a status signal from the passenger safety device indicating that it is not in proper use; and
   an alerting device providing an alert if the processor determines that the passenger is present and the passenger safety device is not in proper use.

2. The system of claim 1, wherein the processor applies a sliding band pass filter to the audio signals to extract an acoustic signature of human speech.

3. The system of claim 2, wherein the processor identifies human speech by calculating a level of acoustic energy at a characteristic frequency band of human speech.

4. The system of claim 1, wherein the processor calculates the control activity value by applying rule-based adaptive gains to values derived from the control activity signal.

5. The system of claim 4, wherein the processor calculates an aggregate rear row activity value wherein the control activity value is combined with a voice output value dependent at least in part upon an acoustic energy level of sound sensed in the rear row.

6. The system of claim 1, wherein the at least one microphone serves as a component of a vehicle occupant communication system.

7. The system of claim 1, wherein the passenger safety device is a seat belt and the status signal indicates whether or not the seat belt is fastened.

8. The system of claim 1, wherein the at least one control is a wireless remote control unit.

9. The system of claim 1, further comprising at least one door sensor monitoring an open/closed status of at least one door of the vehicle and generating signals related to the open/closed status, and the processor is further configured to use the open/closed status in determining whether to activate the alerting device.

10. A method comprising:
    monitoring a control located in a rear row of a vehicle to detect actuation thereof;
    calculating a control activity value based at least in part upon a number of actuations of the control;
    detecting sound in the rear row;
    determining occupancy of the rear row based upon the control activity value and the sound detected in the rear row;
    monitoring a passenger safety device; and
    generating an alert if the rear row is occupied and the monitoring indicates that the passenger safety device is not properly used.

11. The method of claim 10, wherein the step of determining occupancy comprises calculating a voice output value indicating whether or not the detected sound includes human speech.

12. The method of claim 11, wherein calculation of the voice output value comprises determining an acoustic energy level of the detected sound.

13. The method of claim 11, wherein calculation of the voice output value comprises applying a sliding band-pass filter to identify sounds at fundamental frequencies characteristic of human speech.

14. The method of claim 10, wherein the step of detecting sound is performed by at least one microphone serving as a component of a vehicle occupant communication system.

15. The method of claim 10, further comprising:
    monitoring an open/closed status of at least one door of the vehicle; and
    processing signals related to the open/closed status to determine whether to alerting the occupant.

16. The method of claim 10, wherein the step of generating an alert comprises generating at least one of an audio, a voice, a visual, and a haptic stimulus.

17. A method for alerting an occupant of a vehicle when a passenger safety device in a rear row is not properly used, the method comprising:

monitoring at least one control located in the rear row;

calculating a control activity value based at least in part upon a number of actuations of the at least one control;

sensing sound in the rear row;

calculating a voice output value indicating whether or not the sensed sounds include human speech;

considering the control activity value and the voice output value in combination to determine whether a passenger is present in the rear row;

monitoring a status of the passenger safety device to determine if it is properly used; and alerting the occupant if the passenger is present and the passenger safety device is not properly used.

18. The method of claim 17, wherein calculation of the voice output value comprises determining an acoustic energy level of the sound sensed in the rear row.

19. The method of claim 17, wherein calculation of the voice output value comprises applying a sliding band-pass filter to identify sounds at fundamental frequencies characteristic of human speech.

20. The method of claim 17, wherein the step of calculating the control activity value comprises applying rule-based adaptive gains to values derived from the control activity.

\* \* \* \* \*